United States Patent [19]

Nghiem et al.

[11] Patent Number: 5,225,340

[45] Date of Patent: Jul. 6, 1993

[54] PROCESS FOR REDUCING METAL CONCENTRATION IN AQUEOUS SYSTEMS

[75] Inventors: Nhuan P. Nghiem, Naperville; Thomas M. Miller, Aurora; Richard J. Mouche, Batavia, all of Ill.

[73] Assignee: Nalco Chemical Company, Naperville, Ill.

[21] Appl. No.: 723,449

[22] Filed: Jun. 28, 1991

[51] Int. Cl.$^5$ .................. C12P 3/00; C12P 1/04; D06M 16/00; C12R 1/125

[52] U.S. Cl. .................. 435/168; 435/170; 435/252.31; 435/252.5; 435/264; 435/839

[58] Field of Search ............... 435/168, 170, 839, 264, 435/252.31, 252.5

[56] References Cited

U.S. PATENT DOCUMENTS 4,190,463 2/1980 Kaplan ..................... 134/3

OTHER PUBLICATIONS

Product Bullentin A-8161, Nalco Chemical Company, for INOC$_{TM}$ 8161, copyright 1990.

Nalco Water Handbook, pp. 23.1 to 23.22, 2nd Ed., 1988, McGraw-Hill Book Co.

"Waste Treatment of Chemical Cleaning Wastes in the Power Industry", J. E. Brenman, G. R. Mace, Proc. Ind. Waste Conf., vol. Date 1977, 32, pp. 899-905.

"An On-site Chemical Treatment for Removing Iron and Copper From Chelant Cleaning Wastes", M. L. Samuelson, S. B. McConnell, E. F. Hoy, Dowell Schlumberger, Tulsa, Okla., IWC-88-39 pp. 380-385.

"An On-site Chemical Treatment for Removing Iron and Copper from Chelant Cleaning Wastes" John W. Schumann, City of Los Angeles Dept. of Water and Power, Los Angeles, Calif., IWC-88-39, p. 3860387.

Literature Search Report, No. 2859, Disposal and Treatment of Boiler Cleaning Wastes.

*Primary Examiner*—Herbert J. Lilling
*Attorney, Agent, or Firm*—Joan I. Norek; Robert A. Miller; Joseph B. Barrett

[57] ABSTRACT

The concentration of at least one metal species in an aqueous system is at least reduced in an aqueous system that contains at least one kind of chelating agent, by adding to such system a species or plurality of species of bacteria that have a low toxicity for the metal species, and establishing and maintaining a biomass in the system for a suffcient time period to reduce the metal concentration.

13 Claims, No Drawings

PROCESS FOR REDUCING METAL CONCENTRATION IN AQUEOUS SYSTEMS

TECHNICAL FIELD OF THE INVENTION

The present invention is in the technical field of solids/liquids separation, particularly as applied to chelate containing waste waters, such as spent chemical cleaning wastes.

BACKGROUND OF THE INVENTION

The disposal of chelate containing waste waters in a manner that minimizes deleterious environmental effects, and which meets the various governmental standards, can be a significant challenge to various industries. Such industries include the industries generating such waste waters and certain of the waste disposal industries.

A chelate, or chelation complex, is a complex of a compound that contains donor atoms, called a chelating agent, and a metal atom, combined by coordination bonding. Chelation is a means for manipulating and controlling metal ions; the chelation complexes usually have properties that are markedly different from their precursors. Chelation is used in many industries, including without limitation in scale removal from the water side of heat exchange equipment, boilers and the like, in water softening, in ore leaching, in textile processing and many other industries. Chelation may be used to reduce undesirable effects of metal ions, or to provide solubilization, or to provide metal buffering, or other effects.

Industrial chemical cleaning wastes often contain a significant concentration of chelates. Chelating agents are often included in the original cleaning solution, for instance for scale removal activity. The waste waters from such chemical cleaning operation thus often contains such a high level of chelates, or chelation complexes, that treatment of such wastes before disposal is desirable. Such wastes, or spent cleaning solutions, generally require treatment to separate the metal ions from the water, which generally entails freeing the metal ions from the chelates, preventing chelates from reforming, and at times destruction, or removal, of the chelating agents.

Industrial wastes other than spent cleaning solutions may also have significantly high levels or chelates, or may during processing become so concentrated that they then contain high levels of chelates. Such wastes may also require disruption of chelation activity so that the metals being held within the chelates may be removed.

Iron is one of the most prevalent metals in aqueous systems and hence one of the most prevalent targets for metal removal treatments. Iron itself can be removed from aqueous medium, as a precipitate of insoluble iron salt(s), particularly iron hydroxide salt(s), by aeration, pH elevation, flocculation, or combinations of such method. Iron has, however, a strong affinity for chelating agents, and thus conventional methods are generally ineffective in the presence of a significant level of chelating agents. As noted above, the chelates formed by the combination of metal and chelating agents must be broken and not permitted to reform.

Iron may not be the only metal of concern in industrial waste waters. Copper, chromium, nickel, zinc, lead, magnesium, barium, manganese, aluminum, cobalt, molybdenum, titanium, and others may be present in various concentrations and in various combinations. The removal of such metals also may be complicated or frustrated by their combination, or potential of combining, with chelating agents present in the waters.

Conventional methods used to break chelation complexes, and thus release metal ions held therein, generally require drastic elevations in pH, for instance elevations to pH's in excess of 9, and in some instances to pH's of 10 or 11, or even higher. Such highly alkaline conditions may themselves render the treated waste waters unsuitable for disposal or recycle or other uses. Further, the high pH might not break a sufficient amount of chelation complexes to allow the degree of metal precipitation required in order to meet discharge standards; in such instances the alkaline treated waste waters would also still be unsuitable for discharge.

DISCLOSURE OF THE INVENTION

The present invention provides a process for at least reducing the concentration of at least one metal species in certain aqueous systems. Such aqueous systems are those that contain at least one metal species and at least one kind of chelating agent. The process entails first adding to such an aqueous system at least one species of bacteria that has a low metal toxicity. Such species or plurality of species of bacteria should be added in sufficient amount to permit the establishment of a biomass within the aqueous system. Then the conditions within such aqueous system should be maintained sufficiently for the existence of the biomass for a period of time sufficient to reduce the concentration of at least one metal species in the aqueous system.

This process and preferred embodiments thereof are discussed in more detail below.

PREFERRED EMBODIMENTS OF THE INVENTION

The present invention is a process that may be employed to treat any aqueous system that contains at least one metal species and at least one kind of chelating agent. In such an aqueous system the metal species and chelating agent will be at least to some extent combined in the form of chelates, or chelation complexes, or at least the potential for such combination exists. Such aqueous systems are commonly, but not necessarily, waste waters from industrial processes that employ chelating agents for some purposes, such as sequestration, solubilization, metal buffering, or combinations of such purposes.

An aqueous system in which the present process is extremely advantageous is a system that has a relatively high level of both metal and chelating agent such as a spend industrial cleaning solution. The advantages of the present invention are also well seen in bulk volume aqueous systems or aqueous systems having other characteristics which render conventional metal-removing techniques undesirable, even though the concentration of metal and chelating agent may not be as high as in spent cleaning solutions. The process of the present invention would commonly be extremely useful in treating aqueous systems to reduce the concentration of metal therein prior to the recycle and/or disposal of the constituents of such aqueous system, but the process's utility is also applicable to metal concentration reductions for other reasons or purposes.

As indicated above, within the scope of aqueous systems that contain both at least one metal species and at least one kind of chelating agent are aqueous systems in which at least some, and at times a substantial portion, of such metal and chelating agent are present in the system in the form of chelates. Not excluded from such category of aqueous systems are those in which a potential for the formation of chelates exists. For instance, the present invention may be useful for aqueous systems in which the metal species has not yet combined with a chelating agent to form a chelate, but may do so, for instance by a solubilization mechanism.

Thus within the scope of aqueous systems that contain both at least one metal species and at least one kind of chelating agent are aqueous systems that contain a single phase or a plurality of phases, and aqueous systems that range from substantially static aqueous systems to dynamic aqueous systems.

In preferred embodiments, however, the aqueous system advantageously treated by the process of the present invention is a waste water system, and more preferably a spent industrial cleaning solution, particularly when such spent cleaning solution is one containing a relatively high level of metal and chelating agent. In further preferred embodiments the aqueous system advantageously treated by the process of the present invention is one in which the metal species or plurality of metal species is substantially combined with at least one kind of chelating agent in chelation complexes. In further preferred embodiments, the aqueous system advantageously treated by the process of the present invention is one in which reduction of metal concentration is desired by other than conventional metal reduction techniques.

By the terminology "metal species" is meant herein one kind of metal, for instance iron, or copper, and the like, in one kind of form, for instance in ionized form, in salt particle form, and the like.

In most all aqueous systems there would be a plurality of metal species, and in particular a plurality of kinds of metals. There is no practical reason, however, for limiting the use of the present process by excluding those aqueous systems that contain only one kind of metal species, regardless of how rare such aqueous systems may be.

By the terminology "one kind of chelating agent" is meant herein chelating agents of same chemical structure, such as citric acid, or EDTA, and the like. A typical industrial waste water from a process employing chelating agents for one purpose or another may well contain only one kind of chelating agent or at least substantially only one kind of chelating agent, while at the same time many industrial waste waters will contain a plurality of kinds of chelating agents. There is no reason for limiting the present invention to one of either type of aqueous system.

Chelating Agents

A chelating agent is a compound that contains donor atoms that can combine with a metal atom to form a chelation complex or chelate. The most common donor atoms are nitrogen, oxygen and sulfur, but phosphorus, arsenic and selenium also form chelates. Chelating agents are generally organic compounds, and include hydroxycarboxylic acids, such as tartaric acid, citric acid, gluconic acid, and 5-sulfosalicylic acid, aminocarboxylic acids, such as ethylenediaminetetraacetic acid (EDTA), hydroxyethylethylenediaminetriacetic acid (HEDTA), nitrilotriacetic acid (NTA), N-dihydroxyethylglycine, ethylenebis(hydroxyphenylglycine) and the like, phenols, such as salicylaldehyde, disulfopyrocatechol, and chromotropic acid, aminophenols, such as 8-hydroxyquinoline (oxine) and oxinesulfonic acid, polyamines, such as ethylenediamine, triethylenetetramine, and triaminotriethylamin aminoalcohols, such as triethanolamine and N-hydroxyethylethylenediamine, oximes, such as dimethylglyoxime and salicylaldoxime, Schiff bases, such as disalicylaldehyde 1,2-propylenediimine, tetrapyrroles, such as tetraphenyl-porphin and phthalocyanine, 1,3-diketones, such as acetylacetone. trifluoroacetylacetone, and thenoyl-trifluoroacetone, aromatic heterocyclic bases, such as dipyridyl and o-phenanthroline, polyphosphates, such as sodium tripolyphosphate and hexametaphosphoric acid, sulfur compounds, such as toluenedithiol, dimercaptopropanol, thioglycolic acid, potassium ethyl xanthate, sodium diethyldithiocarbamate, dithizone, diethyl dithiophosphoric acid, and thiourea, synthetic macrocyclic compounds, such as dibenzo[18] crown-6, $(CH_3)_6[14]4,11$-dieneN$_4$, and 2.2.2-cryptate, polymeric materials, such as polyethylenimine, polymethacryloylacetone, and poly(p-vinylbenzylimino-diacetic acid), and phosphonic acids, such as nitrilotrimethylenephosphonic acid, ethylenediamine-tetra(methylenephosphonic acid) and hydroxyethylidenediphosphonic acid (HEDP).

Chelating agents are commonly employed for sequestration, solubilization and metal buffering applications. Sequestration is the suppression of certain properties of a metal without removing it from the system or phase, for instance without removing it from an aqueous system. Chelation produces sequestration mainly by converting the metal to a soluble chelate that does not possess the properties to be suppressed. In solubilization, constituents of a normally insoluble phase are caused to dissolve in the medium, which is commonly an aqueous medium, by formation of a chelate having solubilizing groups and a stability sufficient to the metal ion. Chelation buffering permits the addition or removal of an appreciable amount of metal ion with only a relatively small change in concentration of that ion in a solution. In such applications, the activity desired of the chelating agent is generally, although not always, to hold a metal within a complex (chelate) that is soluble in aqueous systems under typical environmental conditions.

The Bacteria

It is believed that the present process achieves a reduction in metal concentration by virtue of a biological digestion mechanism that at least partially degrades chelating agents. In biological digestion, bacteria cultivated under controlled conditions utilize organic matter in the water as their food, producing sludge as a by-product and products of respiration, such as $CO_2$ in aerobic and $CH_4$ in anaerobic systems. Since bacteria are living organisms, conditions that are sufficient for the establishment and maintenance of a biomass are required to substantially maintained for the duration of the process. Such conditions, or factors, generally are the availability of a food supply and nutrients, a suitable temperature climate and pH environment, the availability of oxygen for aerobic systems, and the absence of materials that are toxic to the bacteria.

Since the present process is directed solely to the treatment of aqueous systems that contain at least one metal species, the process requires the addition of at least one species of bacteria that has a low metal toxicity, or at least a low metal toxicity for the metal(s) present in the aqueous system. This requirement does not, however, exclude the addition of a mixed microbiological culture in which some, or even most, of the bacteria strains are subject to metal toxicity, as long as at least one species therein has a low metal toxicity.

Microorganisms can of course have a toxic reaction to materials other than metals, and aqueous systems may contain a wide variety of constituents. Hence it may be recommended to screen the bacteria species or mixed culture against a sample of the water from an aqueous system before use. Such screening can be easily done by the Toxicity Test described below. Such screening is not, however, an essential step in the present process, particularly when the bacteria species, or at least one bacteria species in a mixed culture, has low metal toxicity.

A suitable pH environment is a pH within the range of from about 4.5 to about 10.0, and preferably within the range of from about 5.0 to about 9.0. In further preferred embodiment, the aqueous system should not be subject to sudden, significant changes in pH, such as pH shocks.

Such moderate pH levels, which are generally desirable for the establishment and maintenance of the biomass, is an extremely advantageous feature of the present invention. As mentioned elsewhere herein, conventional processes for reduction of metal in aqueous systems when the metal is, or may be, held in chelation complexes, generally require the pH of the system to be raised to very high levels, creating in itself an undesirable water condition. The present invention is operable in a moderate pH range, and such range further provides sufficient flexibility so that a very specific pH can be targeted, if desired, and reasonable fluctuations can be tolerated if practical factors indicate that less pH control is desirable.

In a more preferred embodiment, the pH of the aqueous system is substantially maintained in the range of from about 7.0 to about 8.5. Such a pH range is even more moderate than the general range of a pH of from about 4.5 to about 10.0 discussed above, and hence advantageously reduces the pH as a deleterious water condition in and of itself. A pH range of from about 7.0 to about 8.5 is a very advantageous range for bacterial colonies generally. In addition, in the absence of a chelating agent, a metal such as iron is almost completely water insoluble when oxidized in such a pH range, and hence will precipitate from the aqueous medium generally without any further treatments upon at least partial degradation of the chelating agent in the present process. Hence conducting the process in the more preferred pH range may lead to the precipitation of iron and possibly other metal species without other effort, or at least place such metals in suitable form for separation techniques conventionally used in the absence of chelating agents.

The digestive activity of bacteria generally approaches zero as the temperature approaches the 32° F. (0° C.) and the bacteria are held in suspended animation if the aqueous system freezes. Thus for a reasonable rate of metal concentration reduction, such low temperatures should be avoided. Similarly excessively high temperatures, favor the thermophilic organisms only, and generally should be avoided. Thus a practical temperature range at normal atmospheric pressures is from about 7.5° C. to about 45° C., although intervals at lower temperatures merely suspends the digestive activity for the duration of such intervals.

Bacterial populations generally require nutrients in addition to carbonaceous food, particularly nitrogen, phosphorus and potassium. Some aqueous systems will have a sufficient supply of such nutrients, while others may require the addition of supplemental nutrients, usually added as ammonium and potassium salts and phosphoric aid.

Further, aeration is generally employed to provide the oxygen required for oxygen-consuming bacteria. A desirable rate of aeration depends upon many factors, including without limitation the desired process duration or retention time, the type of aerators available or desirable, and the like. Air is usually supplied through subsurface diffusers at a rate of about 500 to 900 ft$^3$ per pound (30 to 50 m$^3$/kg) of BOD. When surface aerators are employed, they may supply air at a rate of 1200 to 1800 ft$^3$ per pound (75 to 110 m$^3$/kg) BOD. In some installations it may be convenient to supply pure oxygen rather than air to the aqueous system.

Thus in broad embodiment, the present process requires the addition of at least one species of bacteria that has a low metal toxicity, or at least a low metal toxicity for the metal(s) present in the aqueous system that is being treated.

In a preferred embodiment of the invention, there is added to the aqueous system a bioaugmentation culture commercially available under the tradename of INOC 8161, from Nalco Chemical Company, of Naperville, Illinois. (INOC 8161 is a trademark of Nalco Chemical Company.) INOC 8161 is a formulated microbial product designed to help provide selected cultures capable of biodegrading a wide range of complex aliphatic and aromatic chemicals in aerobic biological wastewater treatment systems. Such formulation contains a range of 13 microorganisms together with surfactants carried on a cereal base. This culture is described in more detail below under the designation of "Culture A".

In a preferred embodiment of the invention, there is added to the aqeuous system a mixed culture that is comparable or equivalent to INOC 8161.

The efficacy of another mixed culture, designated "Culture B", is demonstrated below in Example 3. This mixed culture was isolated from a soil sample which contained partially degraded leaves and grass, and is described in more detail below under its "Culture B" designation.

In a further preferred embodiment, the bacteria species, or one of them, which is added to the aqueous system is *Baccilus subtilis*. A pure culture of this species is employed in Example 16 below, under the designation of "Culture C". As described in more detail below, the pure culture of Culture C was isolated from Culture B.

A suitable minimum dose of bacteria may be about $5 \times 10^2$, or $1 \times 10^3$ CFU/ml ("colony forming units per ml. of aqueous system") and in preferred embodiment is about $1 \times 10^4$ or $5 \times 10^4$ CFU/ml. dosage that is desirable is one that does not unduly delay the process by necessitating a long time period for cell growth before metal concentration reduction is seen, and yet is not excessively high. There is seldom any advantage adding the bacteria culture in high amounts, for instance in amount of about $1 \times 10^6$ CFU/ml or more, when such bacteria concentrations will shortly be provided by cell growth, unless of course the chelating agent concentration is extremely high or a process of unusually short duration is desired.

In a preferred embodiment of the invention, the aqueous system being treated by the present process is one that contains at least 500 ppm of iron in soluble form when the system is at a pH of 8.5. As noted elsewhere herein, in the absence of a chelating agent iron would be mostly in a water insoluble form at a pH of 8.5, and hence such an aqueous system generally presents significant difficulties as to iron concentration reduction. The present process is advantageously employed to reduce iron concentration in such an aqueous system. The presence of other metals in soluble form in this preferred embodiment is not excluded, and such other metals would commonly be found in industrial waters that have 500 ppm or more of iron in soluble form.

For the purpose of determining the amount of iron, or other metal(s), in a soluble form in an aqueous system, as this terminology is used herein, such metal or metals are deemed in soluble form to the extent they pass through a 0.45 micron filter with the filtrate.

In preferred embodiment generally, the aqueous system is one that contains a significant level of at least one species of metal. The actual concentration of metal species that constitutes a significant level in part depends on the identity of the metal species. As noted above, 500 ppm of iron, in soluble form at a pH of about 8.5, is a significant level, and soluble iron concentrations of 1,000 ppm or higher are not unusual. For other heavy metals, such as copper, zinc, nickel, lead, magnesium, chromium, manganese and the like, concentration levels of 5 ppm, or 10 ppm, and higher are deemed significant levels, and often very undesirable levels.

In other preferred embodiment generally, the aqueous system is one that contains a significant level of chelating agent, which generally can be, and herein is, defined as sufficient chelating agent to solubilize a significant level of a metal species. A significant level of chelating agent can also be, and herein is, defined as a concentration level of at least 1,000 ppm of chelating agent, and a more significant, but not uncommon, level would be at least about 5,000 ppm of chelating agent.

In a preferred embodiment, the present process should be of sufficient duration, or provide a sufficient water retention time, to reduce the concentration of the targetted metal species at least about 50 weight percent from that originally present. In more preferred embodiment the targetted metal species is reduced at least 65 weight percent, or more preferably at least 90 weight percent, same basis.

In another preferred embodiment, the present process should be of sufficient duration, or provide a sufficient water retention time, to reduce the targetted metal species to a concentration level of about 250 ppm, or less, and more preferably to a concentration level of about 100 ppm, or even 50 ppm, or less.

In other preferred embodiments, the present process should be of sufficient duration, or provide a sufficient water retention time, to reduce the concentration of soluble iron in the aqueous system at least 50 wt. percent from that originally present, and more preferably at least 65, or even 90, weight percent, same basis.

In other preferred embodiments, the present process should be of sufficient duration, or provide a sufficient water retention time, to reduce the soluble iron in the aqueous system to a concentration level of about 250 ppm, or less, and more preferably to a concentration level of about 100 ppm, or even 50 ppm, or less.

Since it is the presence of chelating agent(s) in the aqueous system that mainly retains iron and other metals in a solubilized form, particularly when the pH of the system is 7.0 or higher, it is expected and commonly found that the present process will reduce the concentration of not only iron, or other targetted metal species, but also almost, if not all, metal species that are present in any significant amount. Such univeral metal species concentration reductions within the preferred parameters set forth above generally will be seen for any metal species in a soluble form at a pH of 8.5 in the amount of 10 or 20 ppm or more.

In preferred embodiment the duration of the present process, or retention time of the waters being treated thereby, is no more than 30 days, and in more preferred embodiment no more than 15. In instances, however, longer time periods can well be tolerated, and may be deemed significantly advantageous over conventional processes despite the time factor required.

In other preferred embodiment, the present process is employed in reducing the metal concentration in aqueous systems that contain, as the major chelating agent, hydroxycarboxylic acid chelating agent(s), such as citric acid, tartaric acid, gluconic acid and the like.

A wide variety of conventional techniques for the separation of solids from liquids are known, and may in instances be used in conjunction with the process of the present invention. For instance, the processes of coagulation and flocculation are available for the separation of suspended solids from water when the natural subsidence rates of such solids are slower than desirable. Filtration, or sedimentation plus filtration, is a well known solids separation technique, which at times is used together with chemical aids. Air flotation clarification is another solids separation technique that may employ chemical aids, such as coagulants or flocculants. The process of the present invention does not exclude the use of such conventional solids/liquids separation techniques, particularly when employed to increase the rate at which the metal is removed from the aqueous system being treated. Nonetheless the present process alone may suffice for the reduction of metal concentration in the aqueous system, the metal concentration being reduced in the sense that insoluble species of such metal are formed and gravitate to a sludge fraction.

The foregoing conventional solids/liquid separation techniques would of course not be generally effective for solubilized chelates, being suitable for solids of at least colloidal size or larger. The potential for using the present process together with such conventional solids/liquid separation techniques, however, permits the present process to be incorporated into programs that already employ one or more solids separation processes.

The process of the present invention is also not limited to a batch type process, but instead may be used in a dynamic or continuous system, the bacteria species being replenished as necessary and the extent of metal concentration reduction at least in part determining the desired retention time of waters in such system.

It is generally desirable to remove from wastewaters at least a portion of their organic materials so as to reduce the oxygen demand imposed upon a receiving stream upon final discharge of such wastewaters. The "total organic carbon" ("TOC") level of wastewaters is an indicator of the oxygen demand characteristics thereof, a decrease in TOC indicating that the oxygen demand has also been decreased. The TOC of an aqueous body or system can be determined more rapidly and economically, and hence monitoring the TOC of an aqueous body or system undergoing treatment is generally an acceptable method of determining the change, if any, in the body's or system's oxygen demand.

It is desirable, although not essential, to reduce the TOC of the spent chemical cleaning solutions, and hence the oxygen demand of the spent chemical cleaning solutions, when treating them according to the process of the present invention.

Culture A

Culture A, sold under the tradename of INOC 8161 by the Nalco Chemical Company, is a formulation containing a range of 13 microorganisms together with surfactants carried on a cereal base. The bacterial strains in the culture include members of the Bacillus, Pseudomonas, Aeromonas and Rhodococcus genera. The bacteria are preserved by freeze-drying before being blended in the final formulation. The surfactants, at low levels, are incorporated into the formulation to supplement the natural production of biosurfactants when, in the initial stages of biodegradation, the microbial numbers are limiting and cell growth is at its maximum. INOC 8161 contains the freeze-dried bacteria, yeast, surfactants and the cereal-based carrier. It is a free flowing granular powder, having a buff to brown color and a specific gravity of from 0.5 to 0.7. The most effective system conditions for use of this product are: a pH of from 4.5 to 9.5, with an optimum at pH of 7.0; a minimum dissolved oxygen content of about 1.0 mg/liter, and an optimum of 2.0 mg/liter; a temperature of from 7.5° to 45° C., with an optimum at 25° C.; and a carbon to nitrogen to phosphorus weight ratio in the aqueous system of from 100:5:1 to 100:10:1, with an optimum at 100:7:1. Metal toxicity is absent. The freeze-dried cultures are preferably reactivated in clean water at a temperature of about 30° C. for a time period of about 30 to about 45 minutes before their addition to an industrial treatment system. The dosage of the product required, and dosage method, is dependent upon the size of the aqueous system, the composition of the waters being treated and the standard of treatment to be achieved. A treatment program may entail the inoculation of the microorganisms to the aqueous system in a plurality of doses over a number of days. The treatment program may also entail the addition of maintenance dose(s) after a primary dose(s).

Culture B

Culture B is a mixed culture isolated from a soil sample which contained partially degraded leaves and grass. The micro-organism, or at least a portion of them, could grow on tannin as the sole carbon source. A species that is very active in the process of the present invention was isolated from Culture B and is designated herein, as a pure culture, as "Culture C" discussed below. A deposit of Culture B has been made to American Type Culture Collection, 12301 Parklawn Drive, Rockville, Maryland 20852, U.S.A., and given the identifying deposit number of ATCC 55386.

Culture C

Culture C is a pure culture of the bacteria species *Baccilus subtilis*. This is one of the tannin-degrading microorganisms isolated from the mixed culture of Culture B. *B. subtilis* is within the genera Bacillus, all species of which are chemoorganotrophic. *B. subtilis* is a gram-positive, catalase-positive, motile bacilli, which does not grow in glucose broth under anaerobic conditions. It reduces nitrate to nitrite, and forms acid, but not gas, from glucose, arabinose and mannitol. A deposit of Culture C has been made to American Type Culture Collection, 12301 Parklawn Drive, Rockville, Maryland 20852, U.S.A., and given the identifying deposit number of ATCC 55385.

Toxicity Test

The efficient use of biodegrading microbial cultures is dependent in part on whether the spent cleaning solution being treated is toxic to the microbial culture employed. The microbial cultures employed in the process of the present invention are aerobic, and for aerobic cultures generally a given aqueous environment is considered toxic to a culture if there is a 20 percent or greater reduction in the oxygen consumption of such culture during the time period of from about 20 to about 30 minutes after the introduction of the culture to the aqueous environment. The normal oxygen consumption of a culture is determined from the change in concentration of dissolved oxygen in a system of the culture in DDI water (distilled deionized water) with the passage of time. The normal oxygen consumption is then compared to the change in concentration of dissolved oxygen in a system of the culture in the aqueous spent cleaning solution, taking into consideration any oxygen reduction effect of the cleaning solution alone (chemical oxygen demand or COD), to determine the variation from normal oxygen consumption.

Correction for Lost Volume

In the following Examples, unless stated otherwise therein, corrections have been applied for lost volumes of the material being treated or the water therein. During the treatment period the container holding the material is generally open to the air, and water is lost through evaporation. In addition, in some instances samples of the material being treated are taken during the processing period. Dilutions and/or mathematical corrections have been used to avoid distortions in the results reported based on concentrations.

pH Adjustments

As seen from the following Examples, the biodigestion process generally will alter the pH of the system as it continues unless the pH change is appropriately counteracted. For instance, the presence of citric acid in the cleaning waste will initially require the addition of a base and/or buffer to raise the pH to that desired for the process. In such system, the biodigestion of the citric acid is followed by an increase in pH as it continues, and hence the pH is monitored, at least at intervals, and appropriate adjustments are made.

Wastewater A

Wastewater A is an industrial aqueous cleaning waste from an industrial heat exchanger system. The original cleaning composition, which is notable for the removing of iron oxide deposits from heat transfer surfaces, employs a combination of a hydrolyzable tannin extract and citric acid, as disclosed in U.S. Pat. No. 4,190,463, issued Feb. 26, 1980 (inventor Roy I. Kaplan), the contents of which are incorporated hereinto by reference. Wastewater A, untreated, contains about 19000 ppm of citric acid and 4350 ppm of tannin. It also contains one or more biocides whose activity, if not nullified, would presumably interfere with the process here. The water analysis of wastewater A (untreated) is set forth below in Table 1 wherein "soluble concentration" refers to the concentration that remains in the filtrate after filtration through a 0.45 micron filter.

TABLE 1

| Species | Concentration Total (ppm) | Concentration Soluble (ppm) |
|---|---|---|
| Sodium ($CaCO_3$) | 4300 | 3400 |
| Calcium ($CaCO_3$) | 98 | 81 |
| Magnesium (Mg) | 68 | 54 |
| Barium (Ba) | 3.3 | |
| Chromium (Cr) | 3.3 | 2.7 |
| Copper (Cu) | 21 | 17 |
| Iron (Fe) | 6200 | 4200 |
| Potassium (K) | 11 | 6.9 |
| Manganese (Mn) | 39 | 31 |
| Nickel (Ni) | 6.7 | 5.2 |
| Thallium (Tl) | 6.4 | 4.4 |
| Zinc (Zn) | 9.6 | 7.6 |
| Phosphorus (P) | 52 | 33 |
| Silica ($SiO_2$) | 88 | 70 |
| Sulfur (S) | 3000 | 2300 |

In addition to the above water analyses for wastewater A, the following species were not detected, presumably being below the 2.4 ppm ICP detection limit: aluminum, boron, cadmium, cobalt, molybdenum, lead, antimony, tin, strontium, titanium vanadium, zirconium, silver, and lithium. In addition, while barium was detected as noted in Table 1 above for total concentration, it was below the detection limit in the soluble portion.

Decrease in Soluble Tannin

As noted above, Wastewater A contains a significant level of dissolved (soluble) tannin. In the following Examples 1 through 4, the process of the present invention is employed on Wastewater A, and effectuates a highly significant reduction in soluble tannin. Culture A, which is used in Examples 1 through 4, unlike Cultures B and C, has not been seen to contain microorganisms that grow on tannin, and thus it is quite likely that the soluble tannin decrease results from precipitation rather than from biodigestion of the tannin itself. It is not known whether reduction of soluble tannin, when employing microorganisms which generally do not digest tannin, is a result that generally follows the degradation of chelating agent or is a result of insolubilization of the tannin via some other mechanism, for instance polymerization of the tannin. Nonetheless, when tannin is present in the wastewater used, reduction of soluble tannin may be another advantage of the present invention.

The abbreviation "ND" or "N.D.", used in several of the following tables, indicates the given parameter was not determined.

EXAMPLE 1

The pH of a portion of wastewater A was adjusted to 7.0 with 50% NaOH, and a one liter sample thereof was transferred to a flask, dosed with 0.14 grams of sodium thiosulfate ($Na_2S_2O_3$), stirred for a one hour reaction period, and then admixed with 5 grams of ammonium chloride ($NH_4Cl$) and 1.15 grams of potassium phosphate, monobasic ($KH_2PO_4$). An 800 ml. aliquot of this treated wastewater sample was then transferred to a one-liter flask, 2.5 grams of Culture A was added, and aeration and mixing was provided for a period of 11 days. These steps were all conducted at ambient room temperature. On the fourth day, antifoam was added to reduce foaming in the flask, the pH was adjusted from 8.21 to 7.0, and a sample of the flask contents was taken, and therefrom it was determined that the microorganisms were alive by microscopic observation. On the eleventh day, the flask contents were analyzed and the results thereof are set forth on Table 2.

TABLE 2

| | |
|---|---|
| Total Iron (ppm) | 7,770 |
| Soluble Iron (ppm) | 16.8 |
| Percent Decrease in Soluble Iron from Initial Sol. Iron | 99.7% |
| Soluble Tannin | 165 |
| Percent Decrease in Soluble Tannin from Initial Sol. Tannin | 96.2% |
| TOC (ppm) | 1,200 |

EXAMPLE 2

The procedure described in Example 1 was repeated except that the step of treating the wastewater with sodium thiosulfate was omitted. On the fourth day, antifoam was neither required nor added, the pH prior to adjustment to 7.0 was at 7.47, and the flask contents sample indicated that the microorganisms were alive. On the eleventh day the flask contents were analyzed and the results thereof are set forth on Table 3.

TABLE 3

| | |
|---|---|
| Total Iron (ppm) | 19,000 |
| Soluble Iron (ppm) | 19,500 |
| Percent Decrease in Soluble Iron from Initial Sol. Iron | none |
| Soluble Tannin | 1,650 |
| Percent Decrease in Soluble Tannin from Initial Sol. Tannin | 62.1% |
| TOC (ppm) | 590 |

EXAMPLE 3

To one liter of wastewater A was added 1.15 grams of potassium phosphate, monobasic ($KH_2PO_4$), 10 ml. of 30% ammonium hydroxide ($NH_4OH$), sufficient concentrated phosphoric acid ($H_3PO_4$) to adjust the pH to 7.0, and then 0.14 grams of sodium thiosulfate ($Na_2S_2O_3$), after which additions the wastewater sample was stirred for a one hour reaction time. A 700 ml. aliquot of this wastewater sample was then transferred to a one liter flask, 80 ml. of liquid culture B was added, and aeration and mixing was provided for a period of eight days. The pH of the flask contents after the addition of the culture was 6.98. These steps were all conducted at ambient room temperature. On the fourth and fifth days the pH was adjusted respectively from 9.02 and 9.05 to 7.0 and 7.02. Also on the fifth day the soluble tannin in the material being treated was determined to be 115 ppm. On the eighth day the treatment process was terminated, and the flask contents were analyzed and the results thereof are set forth below on Table 4.

TABLE 4

| | |
|---|---|
| Total Iron (ppm) | ND |
| Soluble Iron (ppm) | 18 |
| Percent Decrease in Soluble Iron from Initial Sol. Iron | 99.7% |
| Soluble Tannin | 115 |
| Percent Decrease in Soluble Tannin from Initial Sol. Tannin | 96.3 |

EXAMPLE 4

Eighteen liters of wastewater A were transferred to a rectangular glass tank, and treated as follows. 20.7 grams of potassium phosphate, monobasic ($KH_2PO_4$) and 90 grams of ammonium chloride ($NH_4Cl$) were added, and then the pH was adjusted to 7.0 with 50% NaOH. Then 2.52 grams of sodium thiosulfate ($Na_2S_2O_3$) was added and the tank contents were stirred for a one hour reaction period. 18 grams of culture A was then added and aeration and mixing was provided for a period of 15 days, during which time period various pH adjustments were made, and at times the tank contents sampled and analyzed. The pH readings, adjustments, and analyses results are set forth below on Table 5. The soluble tannin concentration on the 15th day represents a 96.6 percent decrease in soluble tannin concentration from the initial concentration. The soluble iron concentration on the 15th day represents a 97.9 percent decrease from the initial soluble iron concentration.

TABLE 5

| Day | pH Reading | pH Adjustment To | Soluble Tannin (ppm) | Soluble Iron (ppm) |
|---|---|---|---|---|
| 2 | 8.12 | 7.04 | ND | ND |
| 2[1] | 7.61 | ND | ND | ND |
| 4 | 8.5 | 7.05 | 1200 | ND |
| 7 | 8.5 | 7.05 | 1215 | ND |
| 8 | 8.4 | 7.0 | ND | ND |
| 11 | 7.61 | 6.96 | 215 | ND |
| 14 | 7.57 | ND | 197 | ND |
| 15 | 7.46 | ND | 150 | 120 |

[1]This second pH reading on day 2 was taken about nine hours after the first pH reading and adjustment.

Wastewater B

Wastewater B has the general water composition set forth in Table 6 below.

TABLE 6

| Species | Total Concentration (ppm) | Concentration of Soluble (ppm) |
|---|---|---|
| Calcium ($CaCO_3$) | 500 | 500 |
| Magnesium ($CaCO_3$) | 260 | 260 |
| Sodium ($CaCO_3$) | 2600 | 2600 |
| Potassium (K) | 12 | 12 |
| Cobalt (Co) | 2.0 | 1.2 |
| Copper (Cu) | 3.3 | 2.6 |
| Iron (Fe) | 1600 | 1600 |
| Manganese (Mn) | 12 | 12 |
| Zinc (Zn) | 12 | 12 |
| Silica ($SiO_2$) | 93 | 93 |
| Sulfur (S) | 1100 | 1100 |

For the analyses above, concentration of soluble species was determined by analyses of the filtrate from filtration through a 0.45 micron filter. Wastewater B had a TOC of 6600 ppm. In addition to the analyses above, it was determined that the following species were less than 10 ppm: aluminum (Al), boron (B), Barium (Ba), lithium (Li), molybdenum (Mo), nickel (Ni), phosphorus (P), lead (Pb), antimony (Sb), tin (Sn), and thallium (Tl). It was also determined that the following species were less than 1 ppm: cadmium (Cd), chromium Cr), strontium (Sr), titanium (Ti), vanadium (V), and zirconium (Zr). Wastewater B is an industrial aqueous cleaning waste from an industrial cooling water system. It contained, at minimum, about 6500 ppm citrate.

EXAMPLE 5

The pH of a portion of wastewater B was adjusted to about 7.1 with 50% NaOH and a 500 ml. sample thereof was transferred to a flask, dosed with 1.0 grams of culture A and 10 ml. of 0.1M potassium phosphate, monobasic ($KH_2PO_4$) which would provide a concentration of the phosphate of about 96 ppm. Aeration was begun and 3 ml. of 1.0M $NH_4Cl$ was charged to the flask, providing a concentration thereof of about 102 ppm. These steps were all conducted at ambient room temperature. The pH was determined at intervals and lowered to about pH of 7, as indicated on Table 7 below, together with total and soluble iron analyses determined at intervals. The time intervals are set forth as the number of days from the commencement of the test, which is considered "0 days". On the 12th day the aeration was found off, and then restored, and the aeration may have been off as long as 30 hours. The pH adjustments were made with 1.5 grams $NaHCO_3$ and 3.0 ml. of about 5N HCl on the 10th day, and with about 5N $H_2SO_4$ as needed on the 14th and 26th days.

TABLE 7

| Day | pH Reading | pH Adjustment To | Total Iron (ppm) | Soluble Iron (ppm) | Percent Decrease in Soluble Iron from Initial Soluble Iron |
|---|---|---|---|---|---|
| 0 | 7.1 | — | 1700 | 1700 | — |
| 10 | 9.6 | 7.1 | 1560 | 7 | 99.6 |
| 14 | 9.3 | 7.0 | 1540 | 35 | 98 |
| 26 | 9.6 | 6.7 | 1390 | 13 | 99 |

EXAMPLES 6 and 7

Two 400 ml. samples of the pH adjusted wastewater of Example 5 were transferred to separate flasks and each dosed with 1.5 grams of $NaHCO_3$, 8.0 ml. of 0.1M $KH_2PO_4$, 2.4 ml. of 1.0M $NH_4Cl$, and then about 0.5 ml. of about 5N $H_2SO_4$ to readjust the pH from about 7.5 to about 7.0. To the flask of Example 6 was charged 0.80 grams of culture A. To the flask of Example 7 was charged 0.40 grams of culture A. Aeration was begun and the pH's of the flask contents were adjusted downward to about 7 at intervals, as indicated on Table 8 below, together with total and soluble iron analyses determined at intervals. The pH adjustments were made with 5N $H_2SO_4$ as needed, which was from about 1.4 ml. to 1.7 ml. per flask per adjustment.

TABLE 8

| Day | pH Reading | pH Adjustment To | Total Iron (ppm) | Soluble Iron (ppm) | Percent Decrease in Soluble Iron from Initial Soluble Iron |
|---|---|---|---|---|---|
| Example 6 | | | | | |
| 0 | 7.0 | — | 1700 | 1700 | — |
| 3 | 8.75 | 6.98 | 1480 | 1500 | 12 |
| 7 | 9.16 | 7.02 | 1440 | 23 | 99 |
| 11 | 9.28 | 6.89 | 1400 | 56 | 97 |
| Example 7 | | | | | |
| 0 | 7.0 | — | 1700 | 1700 | — |
| 3 | 8.92 | 7.01 | 1480 | 1450 | 15 |
| 7 | 9.15 | 7.01 | 1420 | 124 | 93 |
| 11 | 9.30 | 6.85 | 1450 | 34 | 98 |

TABLE 4-continued

| TOC (ppm) | ND |
|---|---|

Wastewater C

Wastewater C has the general water analysis set forth in Table 9 below.

TABLE 9

| Species | Total Concentration (ppm) |
| --- | --- |
| Sodium (CaCO$_3$) | 180 |
| Sulfur (S) | 94 |
| Silica (SiO$_2$) | 430 |
| Calcium (CaCO$_3$) | 110 |
| Magnesium (CaCO$_3$) | >50 |
| Chromium (Cr) | 11 |
| Iron (Fe) | 3900 |
| Manganese (Mn) | 20 |
| Zinc (Zn) | 3.0 |

The total concentrations set forth above for calcium, magnesium, chromium, iron, manganese and zinc also represent the concentrations of the soluble species. In addition to the above analyses, the following species were less than 10 ppm: aluminum (Al), boron (B), barium (Ba), potassium (K), molybdenum (Mo), nickel (Ni), phosphorus (P), lead (Pb), antimony (Sb), tin (Sn), and thallium (Tl). It was also determined that the following species were less than 1 ppm: cadmium (Cd), cobalt (Co), copper (Cu), strontium (Sr), titanium (Ti), vanadium (V), and zirconium (Zr). Wastewater C is an industrial aqueous cleaning waste from an industrial boiler system, the original cleaning composition containing a hydroxyacetic/formic acid combination. It has an original pH of about 3.4, and elevating the pH by titration with 1N NaOH reduces the soluble iron (passing through a 0.45 micron filter) as shown in Table 10 below.

TABLE 10

| pH | Concentration of Soluble Iron (ppm) |
| --- | --- |
| 5.4 | 3440 |
| 6.1 | 2620 |
| 6.8 | 1490 |
| 7.5 | 590 |
| 8.8 | 12 |
| 10.9 | about 1 |

When the pH of wastewater C was elevated to from about 10.7 to about 11.3 by titration with 1N NaOH, the filtrate thereof after filtration through a 0.45 micron filter had the water analysis as set forth in Table 11 below.

TABLE 11

| Species | Concentration (ppm) |
| --- | --- |
| Sodium (Na) | 6400 |
| Potassium (k) | 11 |
| Silica (SiO$_2$) | 51 |
| Iron (Fe) | 1.1 |
| TOC (total organic carbon) | 5000 |

In addition to the analyses set forth on Table 11 above, the following were less than 10 ppm: aluminum (Al), barium (Ba), molybdenum (Mo), nickel (Ni), antimony (Sb), tin (Sn), phosphorus (P), boron (B), calcium (Ca), magnesium (Mg), thallium (Tl), and lead (Pb). In addition, the following were less than 1 ppm: cadmium (Cd), cobalt (Co), chromium (Cr), copper (Cu), manganese (Mn), strontium (Sr), titanium (Ti), vanadium (V), zinc (Zn), and zirconium (Zr).

EXAMPLE 8

The pH of a portion of wastewater C was adjusted to about 7.0 with 50% NaOH and a 500 ml. sample thereof was transferred to a flask and dosed with 1.0 grams of culture A and 10 ml. of 0.1M KH$_2$PO$_4$ which provided a concentration of the phosphate of about 96 ppm. Aeration was begun and 3 ml. of 1.0M NH$_4$Cl was charged to the flask which provided a concentration thereof of about 102 ppm. The pH was adjusted at the 10th day from 5.20 to 6.90 with 1.5 g. NaHCO$_3$ and 1.6 ml. of 4N NaOH. On the 12th day the aeration was found off and restored, and may have been off for as long as 30 hours. The total and soluble iron analyses, determined at intervals, are set forth below in Table 12.

TABLE 12

| Day | Total Iron (ppm) | Soluble Iron (ppm) | Percent Decrease in Soluble Iron From Initial Soluble Iron |
| --- | --- | --- | --- |
| 10 | 3449 | 1510 | 56 |
| 26 | 3400 | 833 | 76 |

Wastewater D

Wastewater D is an industrial aqueous cleaning waste from an industrial boiler system, the original cleaning composition containing ammoniated EDTA. It has a pH of about 8.9, a TOC of about 4,500 ppm, and contains about 0.5 weight percent EDTA. Its general water composition is set forth in Table 13 below, and in addition it contains less than 0.1 ppm of antimony (Sb), tin (Sn), boron (B), and thallium (Tl), and less than 0.01 ppm of cadmium (Cd) and vanadium (V).

TABLE 13

| Species | (Wastewater D) Total Concentration (ppm) |
| --- | --- |
| Sodium (Na) | 350. |
| Potassium (K) | 11. |
| Aluminum (Al) | 1.8 |
| Barium (Ba) | 1.1 |
| Molybdenum (Mo) | 4.3 |
| Nickel (Ni) | 3.7 |
| Phosphorus (P) | 3.2 |
| Sulfur (S) | 89. |
| Silica (SiO$_2$) | 26. |
| Calcium (Ca) | 21. |
| Magnesium (Mg) | 30. |
| Lead (Pb) | 0.4 |
| Cobalt (Co) | 1.8 |
| Chromium (Cr) | 11. |
| Copper (Cu) | 0.08 |
| Iron (Fe) | 1700. |
| Manganese (Mn) | 11. |
| Strontium (Sr) | 0.26 |
| Titanium (Ti) | 0.09 |
| Zinc (Zn) | 5.9 |
| Zirconium (Zr) | 0.08 |

EXAMPLES 9 and 10

Two 200 ml. samples of wastewater D were transferred to separate flasks, together each with 200 ml. of tap water, in which had been soaked a certain amount of culture A for 2 hours at 48° C. The 200 ml. of tap water charged to the Example 9 flask contained 5 grams of culture A; the 200 ml. of tap water charged to the Example 10 flask contained 10 grams of culture A. To each flask was added 1.0 ml. of phosphoric acid (ortho-, H$_3$PO$_4$, about 70% concentration), about 1 gram NaHCO$_3$, and 50%.NaOH to a pH of 8.0. Aeration and mixing was commenced and continued for the duration of the test. At intervals, the pH was lowered and the total and soluble iron determined, as set forth in Tables 14 and 15 below. The pH adjustments were made using the required amount of 5N $H_2SO_4$ or a combination of 5N $H_2SO_4$ and $NaHCO_3$, and no more than 1.8 ml. of the $H_2SO_4$ and no more than 0.75 grams of the $NaHCO_3$ was added for any separate pH adjustment.

TABLE 14
(Example 9)

| Day | pH Reading | pH Adjustment To | Total Iron (ppm) | Soluble Iron (ppm) | Percent Decrease in Soluble Iron from Initial Soluble Iron |
|---|---|---|---|---|---|
| 0 | 8.0 | — | 700 | 700 | — |
| 1 | 9.18 | 7.90 | 780 | 830 | — |
| 2 | 8.90 | 7.6 | 749 | 728 | — |
| 3 | 7.76 | — | 747 | 744 | — |
| 30 | 8.62 | — | 683 | 562 | 20 |
| 42 | 8.59 | 7.40 | 710 | 542 | 23 |
| 56 | 7.99 | 7.52 | 690 | 520 | 26 |
| 72 | 9.30 | 7.11 | 636 | 461 | 34 |

TABLE 15
(Example 10)

| Day | pH Reading | pH Adjustment To | Total Iron (ppm) | Soluble Iron (ppm) | Percent Decrease in Soluble Iron from Initial Soluble Iron |
|---|---|---|---|---|---|
| 0 | 8.00 | — | 700 | 700 | — |
| 1 | 8.85 | 7.90 | 830 | 780 | — |
| 2 | 7.26 | — | 744 | 723 | — |
| 3 | 7.96 | — | 721 | 719 | — |
| 30 | 8.9 | — | 600 | 300 | 57 |
| 42 | 9.06 | 7.36 | 565 | 233 | 67 |
| 56 | 8.97 | 7.56 | 580 | 190 | 73 |
| 72 | 9.36 | 7.10 | 622 | 153 | 78 |

EXAMPLES 11 to 15

Five 200 ml. samples of wastewater D were transferred to separate flasks, together each with 200 ml. of tap water, in which had each been soaked 10 grams of culture A at 50° C. for a two hour period. To each flask was also added 0.5 ml. of 1N $H_2SO_4$, and varying amounts of $KH_2PO_4$, as noted below. Aeration, while mixing, was commenced for each and continued for at least 46 days, without any interim pH adjustments. In Table 16 below, for each Example is set forth the amount of $KH_2PO_4$ charged, the pH at day 46, the total and soluble iron, and decrease in iron, at day 46, the decrease in iron being based upon an initial total and soluble iron content of 700 ppm.

TABLE 16

| Example | $KH_2PO_4$ added (ml. 0.1 M) | pH | Total Iron (ppm) | Soluble Iron (ppm) | Percent Decrease in Soluble Iron from Initial Soluble Iron |
|---|---|---|---|---|---|
| 11 | 0.5 | 8.33 | 592 | 417 | 40 |
| 12 | 1.0 | 8.33 | 658 | 341 | 51 |
| 13 | 1.5 | 8.50 | 641 | 321 | 54 |
| 14 | 2.5 | 8.63 | 701 | 320 | 54 |
| 15 | 5.0 | 8.43 | 696 | 368 | 47 |

EXAMPLE 16

The wastewater treated in this Example 16 had a high citric acid and iron content, but differed for instance from Wastewater A in that it had a very low tannin content. This wastewater also had high levels of copper, zinc, nickel and lead. This wastewater was treated using Culture C and the method described above for Example 3. This process was continued until the ninth day (that is, on day "9", the dose of Culture C being added to the aqueous system on day "0"). On Table 17 below there is shown the pH of the system, and the adjustments of the pH downward that were made t intervals during the process. On Table 18 below there is shown the citric acid, iron, copper and other metals content of the aqueous system on day 0 (before addition of the bacteria), day 7 and day 9. The iron, copper, zinc and nickel were all reduced to concentration levels that were at most one-third of their original concentration levels, and for iron and copper the concentrations remaining soluble on day 9 were less than one weight percent of the original concentration levels. Similarly the citric acid was reduced from the original 12,000 ppm level to less than 10 ppm. The process exemplified in this Example 16 aptly demonstrates the use of the present invention for the removal of iron and heavy metals other than iron by the biodigestion of the chelating agent.

TABLE 17

| Day | pH Before Adjustment | pH After Adjustment | Total Viable Counts (CFU/ml.) |
|---|---|---|---|
| 0 | 7.0 | — | $7.0 \times 10^4$ |
| 1 | 7.68 | 6.90 | N.D. |
| 2 | 7.05 | — | N.D. |
| 4 | 8.33 | 6.97 | N.D. |
| 5 | 8.52 | 6.98 | $6.8 \times 10^9$ |
| 7 | 8.35 | 6.99 | $1.7 \times 10^9$ |
| 9 | 7.25 | — | N.D. |

The cell growth observed, and shown in Table 17 above, was tremendous. After day 5, biopolymer was formed in large quantities and prevented accurate determination of total viable cell count.

TABLE 18

| Constituent | Constituent Concentration (ppm) | | |
|---|---|---|---|
| | At day 0 | At day 7 | At day 9 |
| Citric acid | 12,000 | <10 | <10 |
| Iron | 5,600 | 42 | 18 |
| Copper | 360 | 54 | 44 |
| Zinc | 310 | <2.5 | <2.5 |
| Nickel | 29 | 4.9 | 3.9 |
| Lead | 5.5 | <2.5 | <2.5 |
| Tannin | <50 | <50 | <50 |

Industrial Applicability of the Invention

The present invention is applicable to those industries which use chelating agents for various purposes, and those industries that have a need to reduce the metal concentration in aqueous systems which also contain chelating agents. Such industries include, but are not limited to, industries using chemical cleaning solutions that contain chelating agents, and waste disposal industries that handle spend chemical cleaning solutions.

We claim:

1. A process for at least reducing the concentration of at least one solubilized metal species in an aqueous system that contains at least one solubilized metal species and at least on chelating agent for said solubilized metal species comprising:

adding to said aqueous system bacteria of Culture B, ATCC 55386 Culture C, ATCC 55385 or combinations thereof;

said bacteria being added in sufficient amount to establish a biomass of said bacteria within said aqueous system; and maintaining a pH of from about 5 to about 9 and a temperature of from about 7.5° C. to about 45° C. within said aqueous system for a time period sufficient to at least reduce the concentration of said solubilized metal species in said aqueous system.

2. The process of claim 1 wherein the pH of said aqueous system is maintained substantially within the range of from about 7.0 to about 8.5.

3. The process of claim 1 wherein oxygen is added to said aqueous system by aeration.

4. The process of claim 1 wherein said bacteria are added in the amount of at least $5 \times 10^2$ CFU/ml.

5. The process of claim 1 wherein said solubilized metal species is reduced to at least 90 percent of its initial concentration in said aqueous system.

6. The process of claim 1 wherein said aqueous system is subjected to at least one solids separation technique to separate from said aqueous system solid material generated by said process.

7. The process of claim 1 wherein said aqueous system is substantially a spent chemical cleaning solution.

8. The process of claim 1 wherein said aqueous system contains soluble tannin and the concentration of said soluble tannin is reduced.

9. A process for at least reducing the concentration of at least one solubilized metal species in an aqueous system that contains at least one solubilized metal species and a hydroxycarboxylic acid type of chelating agent for said solubilized metal species comprising:

adding to said aqueous system bacteria of Culture B, Culture C, or combinations thereof;

said bacteria being added in sufficient amount to establish a biomass of said bacteria within said aqueous system; and maintaining a pH of from about 5 to about 9 and a temperature of from about 7.5° C. to about 45° C. within said aqueous system for a time period sufficient to at least reduce the concentration of said solubilized metal species in said aqueous system.

10. The process of claim 9 wherein said solubilized metal species is reduced to at least 90 percent of its initial concentration in said aqueous system.

11. The process of claim 9 wherein said aqueous system contains, at the time said bacteria are added, at least 500 ppm of solubilized iron.

12. The process of claim 11 wherein said biomass is maintained for a time period sufficient to reduce said solubilized iron to a solubilized iron concentration of 100 ppm or less in said aqueous system.

13. The process of claim 11 wherein said biomass is maintained for a time period sufficient to reduce said solubilized iron to a solubilized iron concentration of 50 ppm or less in said aqueous system.

* * * * *

UNITED STATES PATENT AND TRADEMARK OFFICE
CERTIFICATE OF CORRECTION

PATENT NO. : 5,225,340
DATED : July 6, 1993
INVENTOR(S) : N.P. Nghiem, T.M. Miller and R.J. Mouche It is certified that error appears in the above-indentified patent and that said Letters Patent is hereby corrected as shown below:

In column 4, line 5, delete "triaminotriethylamin" and substitute therefor
-- triaminotriethylamine, --.

In column 18, line 4, after "made" delete "t" and substitute therefor -- at --.

In column 18, line 61, which is line 4 of claim 1, after "least" delete "on"
and substitute therefor -- one --.

In column 18, line 64, which is line 7 of claim 1, delete "ATCC 55386"
and substitute therefore -- (ATCC 55386), --.

In column 18, line 64, which is line 7 of claim 1, delete "ATCC 55385"
and substitute therefor -- (ATCC 55385) --.

Signed and Sealed this

Twenty-fifth Day of January, 1994

Attest:

BRUCE LEHMAN

*Attesting Officer*            *Commissioner of Patents and Trademarks*